(12) United States Patent
Wingen

(10) Patent No.: US 9,776,486 B2
(45) Date of Patent: Oct. 3, 2017

(54) ARRANGEMENT COMPRISING A COVER FOR A VEHICLE ROOF

(71) Applicant: Webasto SE, Stockdorf (DE)

(72) Inventor: Bernhard Wingen, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 15/313,440

(22) PCT Filed: May 19, 2015

(86) PCT No.: PCT/EP2015/060999
§ 371 (c)(1),
(2) Date: Nov. 22, 2016

(87) PCT Pub. No.: WO2015/181000
PCT Pub. Date: Dec. 3, 2015

(65) Prior Publication Data
US 2017/0197496 A1    Jul. 13, 2017

(30) Foreign Application Priority Data
May 30, 2014   (DE) .................. 10 2014 107 662

(51) Int. Cl.
  *B60J 7/057*   (2006.01)
  *B60J 7/043*   (2006.01)
  *B60J 7/05*    (2006.01)

(52) U.S. Cl.
  CPC .............. *B60J 7/0435* (2013.01); *B60J 7/05* (2013.01)

(58) Field of Classification Search
  CPC ..................................................... B60J 7/0435
  (Continued)

(56) References Cited

U.S. PATENT DOCUMENTS

| 2010/0164253 A1 | 7/2010 | Faerber et al. |
| 2013/0187412 A1* | 7/2013 | Nellen ............... B60J 7/024 296/216.05 |
| 2013/0307296 A1 | 11/2013 | Sawada |

FOREIGN PATENT DOCUMENTS

| CN | 102642457 A | 8/2012 |
| DE | 102005007031 B4 | 5/2007 |

(Continued)

OTHER PUBLICATIONS

International Search Report for PCT/EP2015/060999 dated Jul. 20, 2015; English translation submitted herewith (7 pages).

*Primary Examiner* — Dennis H Pedder
(74) *Attorney, Agent, or Firm* — Fitch, Even, Tabin & Flannery, LLP

(57) ABSTRACT

A cover for a vehicle roof, which can be raised in its rear region by deployment means in order to open the opening. The deployment means may have a cover having a front edge and a rear edge, which lies opposite the front edge. The deployment means may have a sliding carriage which can be displaced in a guide rail in the vehicle longitudinal direction by a drive. The deployment means may also have a deployment lever that has a front end region, a rear end region and a coupling element arranged between the front end region and rear end region. The deployment means may have a slotted guide carriage arranged to be displaceable in the guide rail in the vehicle longitudinal direction, and a control rod coupled to the sliding carriage and guided to be displaceable relative to the guide rail in the vehicle longitudinal direction.

10 Claims, 5 Drawing Sheets

Figure 1:
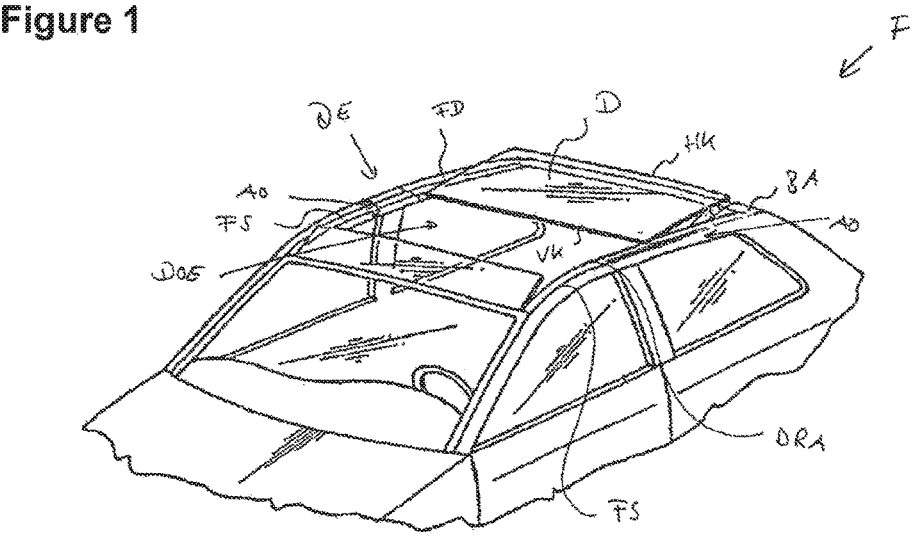

(58) Field of Classification Search
USPC .................. 296/216.02–216.05, 223, 220.01
See application file for complete search history.

(56) References Cited

FOREIGN PATENT DOCUMENTS

| | | |
|---|---|---|
| DE | 102007003354 A1 | 7/2008 |
| JP | H0732888 A | 2/1995 |
| JP | 2010247572 A | 11/2010 |
| JP | 2013237422 A | 11/2013 |
| WO | 2007/079747 A1 | 7/2007 |

* cited by examiner

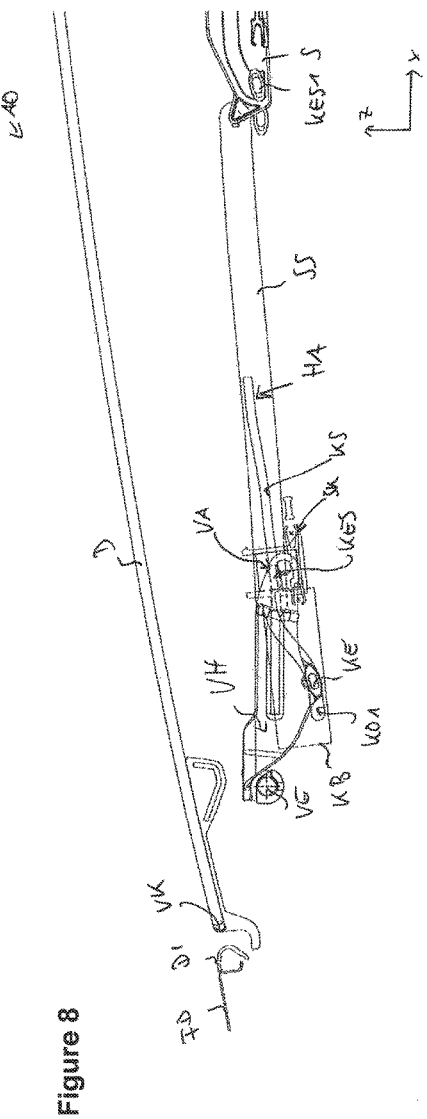

ARRANGEMENT COMPRISING A COVER FOR A VEHICLE ROOF

CROSS-REFERENCE TO RELATED APPLICATIONS

This application is a U.S. national phase application filed under 35 U.S.C. §371 of International Application No. PCT/EP2015/060999, filed May 19, 2015, designating the United States, which claims priority from German Application No. 10 2014 107 662.1 filed May 30, 2014, which are hereby incorporated herein by reference in their entirety for all purposes.

FIELD

The invention relates to an arrangement comprising a cover for a vehicle roof. Starting from a closed position for closing a roof opening, the cover is able to be raised in the rear region thereof by deployment means in order to open the opening.

BACKGROUND

Typically, during the opening process of the roof opening a drive slide is displaced in the vehicle longitudinal direction. In this case, a rear edge of the cover facing the rear of a vehicle is initially raised so that the cover is obliquely positioned. This position is also denoted as the ventilation position. In the usual manner, at the same time a front edge of the cover is lowered since the cover rotates about a front bearing point of a front deployment lever. In this case, during the movement of the cover from the closed position into the ventilation position relative to a vehicle longitudinal direction the deployment lever is stationary. The lowering of the cover front edge downwardly may be, for example, up to 6 mm or more.

SUMMARY

One object of the invention is to disclose an arrangement comprising a cover for a vehicle roof which is characterized by a precise operation.

According to the invention, an arrangement comprising a cover for a vehicle roof is disclosed, said cover, starting from a closed position for closing a roof opening, being able to be raised in the rear region thereof by deployment means in order to open the roof opening. The cover comprises a front edge and a rear edge opposing the front edge. The deployment means have a sliding carriage which is able to be displaced in a guide rail in the vehicle longitudinal direction. Moreover, the deployment means comprise a deployment lever having a front end region, a rear end region and a coupling element arranged between the front end region and the rear end region. In the closed position of the cover, the deployment lever is in engagement with a slotted link which is stationarily fixed relative to the guide rail by means of the coupling element. Moreover, the deployment means comprise a slotted link carriage which is arranged so as to be displaceable in the guide rail along the vehicle longitudinal direction, the deployment lever being coupled thereby in a manner which is pivotable and displaceable in a direction between the cover and the guide rail. In particular, the deployment lever is displaceably coupled to the slotted link carriage, in a substantially vertical manner between the cover and the guide rail. Additionally, the deployment means comprise a control rod which is coupled to the sliding carriage and which is guided so as to be displaceable relative to the guide rail in the vehicle longitudinal direction. For example, the control rod is pivotably coupled to the sliding carriage. The control rod comprises a slotted control link, the deployment lever being coupled thereto such that in a first movement segment, starting from the closed position of the cover, with a displacement of the sliding carriage in the vehicle longitudinal direction to the rear, the slotted control link controls a rotation of the deployment lever around the coupling element.

For example, the cover is able to be displaced to the rear via the vehicle roof into an open position, after the cover has been deployed in the region of the rear edge thereof. The displacement of the cover via the vehicle roof means that, after lifting or deployment in the region of the rear edge, the cover is pushed over an outer face of the vehicle roof. Preferably, the arrangement is a sliding roof in which the guide rails extend to the rear beyond the roof opening in the vehicle longitudinal direction. The sliding roof is also denoted as an externally guided sliding roof. Alternatively, the arrangement may also be a sliding-tilting roof or a spoiler roof.

The positional information or directional information used, such as "rear" or "front" refer to the vehicle longitudinal direction. The vehicle longitudinal direction may also be denoted as the horizontal direction or the X-direction of the mathematical right-handed system. The deployment or lifting of the cover takes place substantially in a vertical direction and/or Z-direction of the mathematical right-handed system. The rear region of the cover, for example, is to be understood as the region which, starting from a center of the cover, faces the rear of a vehicle.

The deployment lever is, for example, a front deployment lever. The deployment lever is able to be rotated with the front end region in a region of the front edge of the cover coupled thereto. The deployment lever is pivotably coupled to the rear end region and coupled to the slotted link carriage so as to be displaceable vertically in the direction between the cover and the guide rail. The coupling element of the deployment lever is arranged between the front end region and the rear end region, so that with the rotation of the deployment lever the front end region and the rear end region move in opposing directions.

In the first movement segment, the cover is moved by means of the displaceable sliding carriage into the ventilation position, wherein a rear edge of the cover is raised. To this end the sliding carriage is coupled to a drive. In this case, the deployment lever remains substantially in its position relative to the vehicle longitudinal direction. In other words, the cover D and thus the deployment lever in the first movement segment are not displaced in the vehicle longitudinal direction. The slotted control link has a path which is predetermined such that a movement of the sliding carriage coupled to the control rod in the first movement segment controls a rotation of the deployment lever around the coupling element. As a result, the rear end region of the deployment lever is moved in the direction of the guide rail, whilst the front end region of the deployment lever is moved upwardly away from the guide rail. The rotation of the deployment lever is permitted, in particular, by the deployment lever being vertically displaceably coupled at the rear end region to the slotted link carriage.

A lowering of the front edge of the cover in the direction of the guide rail when deploying the rear edge of the cover into the so-called ventilation position may be compensated by the rotation of the deployment lever. In particular, a movement of the front edge of the cover is controlled by the rotation of the deployment lever, in particular a spacing of the front edge to the guide rail. Depending on requirements, for example, it is controlled whether the front edge of the cover remains in its position or is slightly lowered. If the front end region were not moved away from the guide rail, the cover would rotate around the rear end region and/or the deployment lever around the coupling element such that the front edge of the cover would be moved downwardly in the direction of the guide rail. However, this is counter-controlled by the control rod and the slotted control link thereof so that the vertical spacing between the front edge of the cover and the guide rail remains substantially constant when moving into the ventilation position. Thus, in the first movement segment an edge of the vehicle roof defining the roof opening remains substantially flush with the front edge of the cover. Also, a minimal lowering of the front edge may also substantially encompass a few tenths of a millimeter or whole millimeters. As a result, for example, the front edge is prevented from moving away from a seal on the roof opening. Moreover, undesirable noise may be avoided. Additionally, it is achieved that a sharp edge which causes negative noise development and high wind resistance when the vehicle travels at high speed, for example up to 300 km/h, is not formed. Moreover, it is possible to save constructional space since, when deploying the rear edge of the cover into the ventilation position, the cover in the region of the front edge makes substantially no movement downwardly in the Z-direction.

According to one embodiment, in the first movement segment the slotted control link controls a vertical movement of the rear end region of the deployment lever such that a distance between the front edge of the cover and the guide rail remains substantially the same. In this case, a path of the slotted control link is configured such that the front edge of the cover is not lowered and/or moved in the direction of the guide rail. This is essentially the above-described meaning.

According to a further embodiment, the control rod is guided relative to the guide rail so as to be displaceable on the slotted link carriage. Thus it is possible that, when displacing the sliding carriage to the rear in the vehicle longitudinal direction, the control rod is displaced relative to the slotted link carriage and thus the deployment lever. Moreover, as a result, it is possible to dispense with an additional slotted link, which is stationarily fixed for example relative to the guide rail and which might be necessary in order to guide the control rod in the vehicle longitudinal direction. In this case, the control rod, for example, is not displaceable in the Z-direction, in particular, in the region of the slotted link carriage.

According to a further embodiment, the arrangement further comprises a sliding element which is pivotably arranged on the deployment lever in its rear region. Moreover, the sliding element is coupled in a vertically displaceable manner to the slotted link carriage and comprises a coupling element, the sliding element being guided thereby in the slotted control link. By means of the additional sliding element, the pivotable coupling and the vertically displaceable coupling is apportioned between the deployment lever and the slotted link carriage. Firstly, the deployment lever is pivotably coupled to the sliding element and secondly, the sliding element is in turn guided in a vertically displaceable manner in the slotted link carriage. Additionally, the deployment lever is in engagement with the slotted control link of the control rod, not the deployment lever itself but indirectly via the sliding element. Thus, when displacing the sliding carriage and thus the control rod, the sliding element is vertically displaced, said sliding element transmitting the vertical movement thereof to the deployment lever. As a result, a conventional deployment lever may be used, amongst other things, by using a sliding element in the described arrangement without modifications. The coupling element of the sliding element may be designed, therefore, such that it is guided over a large surface area in the slotted control link and thus ensures an effective force transmission by means of surface pressure. As a result, the deployment lever is not rotatably guided in the slotted control link by means of a cylindrical coupling element. With such a rotatable guidance a linear pressure would be present as a result of the coupling element, which would cause significantly greater wear in comparison with surface pressure.

"Sliding element" is understood as a mechanical component which is pivotably arranged on the deployment lever.

According to a further embodiment, a distance between the slotted control link and the guide rail is altered in the vehicle longitudinal direction. Preferably, the path of the slotted control link is altered such that a distance between the slotted control link and the guide rail increases to the rear relative to the vehicle longitudinal direction. The rotation of the deployment lever may be controlled by a slotted control link configured in such a manner.

According to a further embodiment, the sliding carriage is displaceably coupled to the slotted link carriage via the control rod, such that in the first movement segment a distance between the sliding carriage and the deployment lever is increased. In other words, when displacing the sliding carriage by means of the drive the rear edge of the cover is initially displaced in order to move into the ventilation position, wherein the deployment lever remains substantially in its position. When the sliding carriage is displaced, in the first movement segment the distance is consequently altered between the sliding carriage and the slotted link carriage and/or the deployment lever.

According to a further embodiment, the arrangement comprises a further deployment lever which is pivotably coupled in the region of the rear edge to the cover and to the sliding carriage so that, when the sliding carriage is displaced, in the first movement segment a deployment of the cover is controlled, wherein a distance between the rear edge of the cover and the guide rail is increased. By means of the further deployment lever, the cover may be moved into the ventilation position in the first movement segment.

Further embodiments are described in the subclaims and in the following extensive description of an exemplary embodiment with reference to the accompanying drawings.

Elements or features having the same construction or function are provided with the same reference numerals in all of the figures. Elements or features which are described by means of reference numerals are not necessarily provided with reference numerals in all of the figures.

BRIEF DESCRIPTIONS OF THE DRAWINGS

Figure 2:
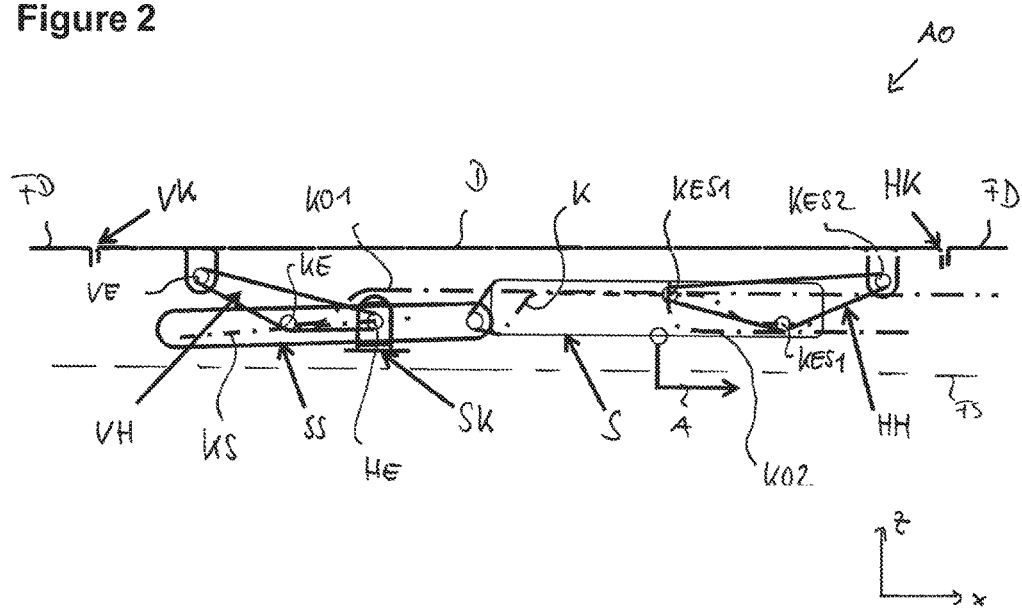
Figure 3:
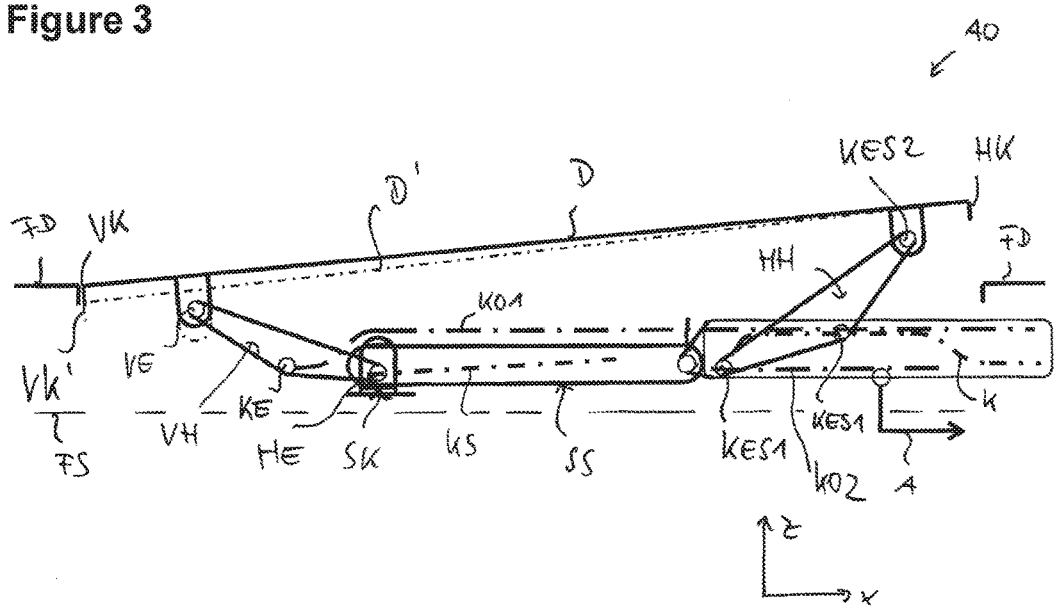
Figure 4:
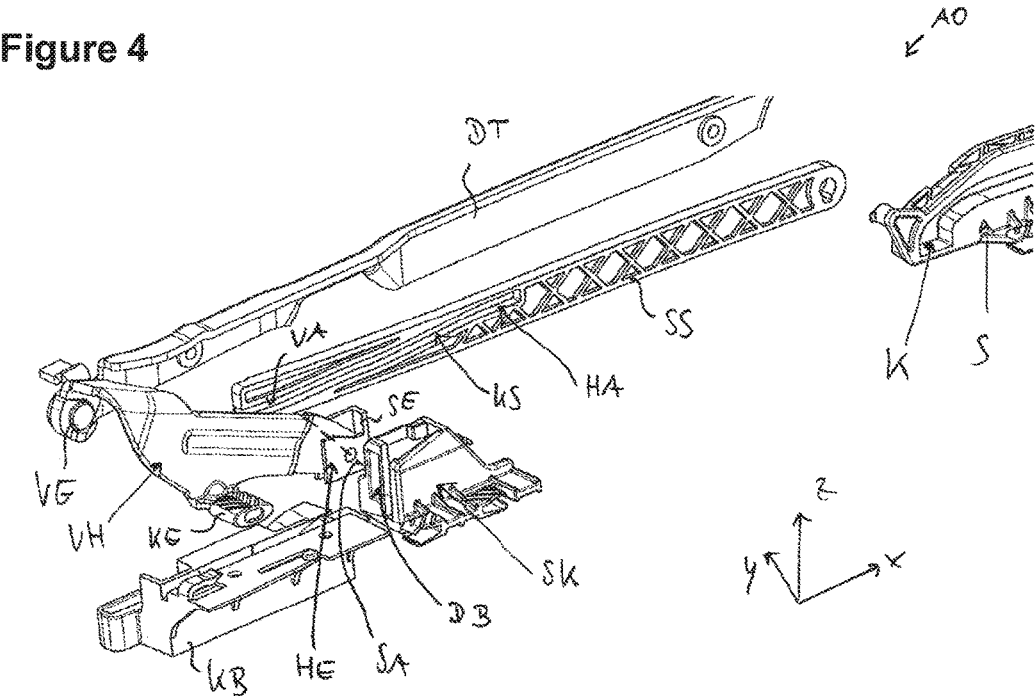
Figure 5:
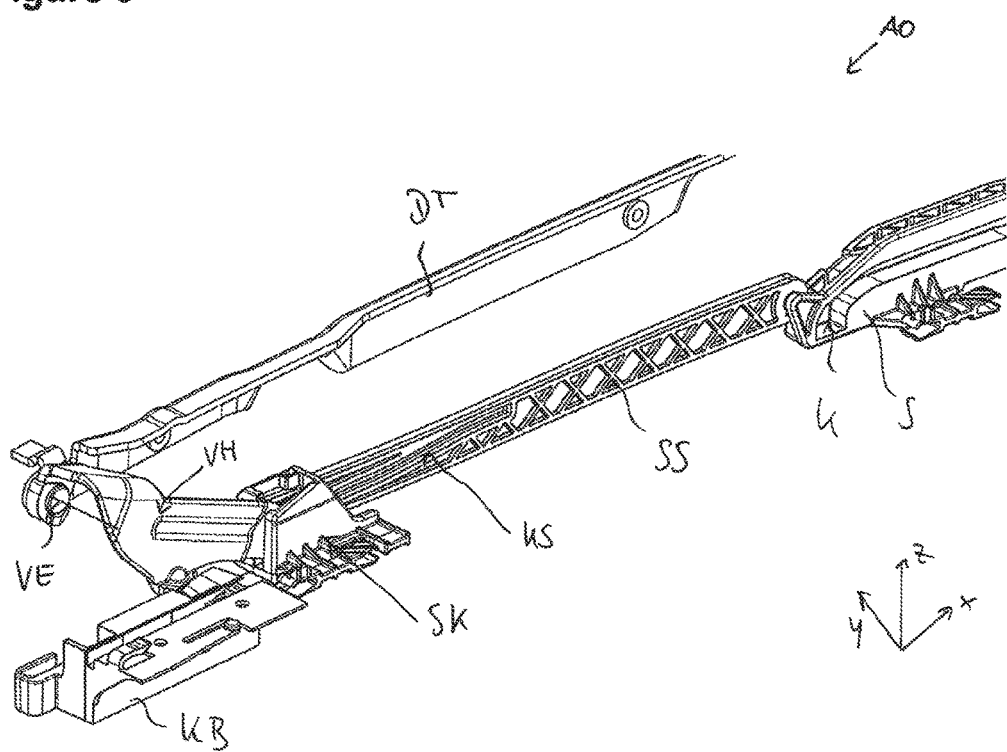
Figure 6:
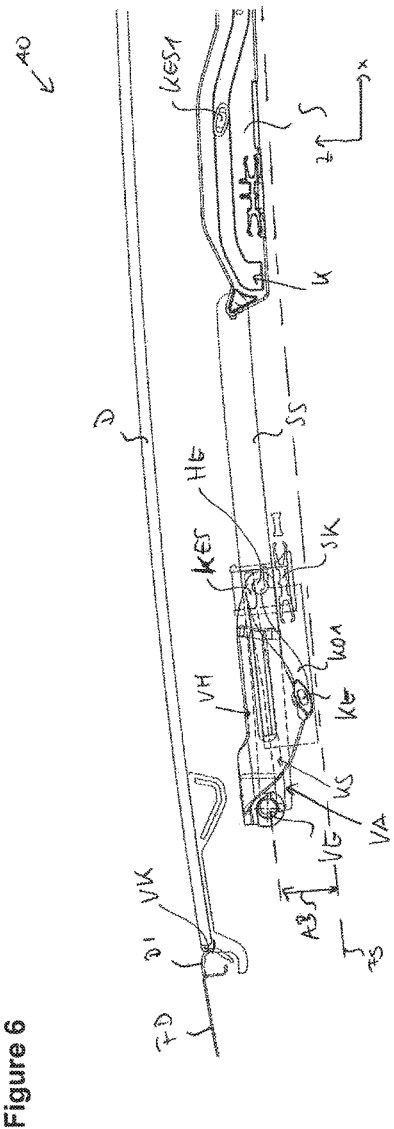
Figure 7:
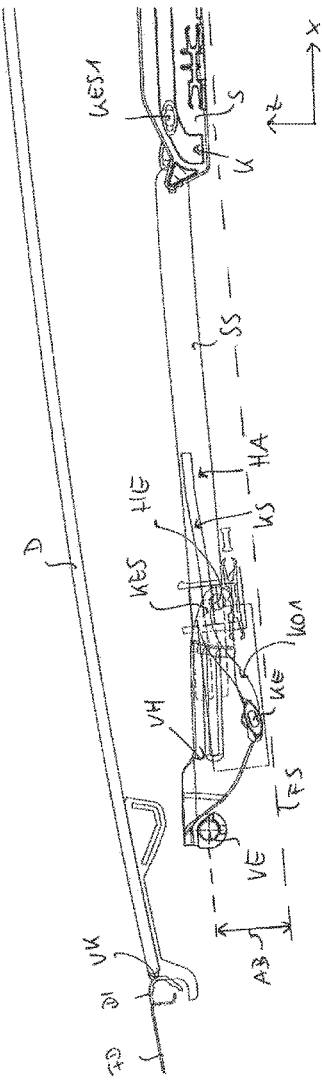

In the figures:

FIG. 1 shows a schematic perspective view of a vehicle,

FIG. 2 shows a schematic view of a kinematic principle of an arrangement for the vehicle roof, FIG. 3 shows a schematic view of the kinematic principle of the arrangement in the ventilation position, FIG. 4 shows a perspective exploded view of the arrangement, FIG. 5 shows a perspective view of the arrangement according to FIG. 3 in an assembled state and FIGS. 6 to 8 show three schematic two-dimensional views of the arrangement in different positions of the arrangement.

DETAILED DESCRIPTION

FIG. 1 shows a schematic perspective view of a vehicle F with a vehicle roof FD. The vehicle roof FD comprises a fastening portion BA which is fixed to the vehicle and which is configured as a roof skin. The fastening portion BA which is fixed to the vehicle is provided with a roof opening DOE which is optionally closed or at least partially openable by means of an adjustable movable roof element DE.

The roof opening DOE is defined by a roof frame portion DRA which is configured on the vehicle roof FD. The roof frame portion DRA preferably has arrangements AO with guide rails FS arranged on both sides.

The roof element DE has a cover D and is relatively displaceably mounted in relation to the guide rail FS in the region of the fastening portion BA. In this case, the roof element DE is displaceably mounted in the guide rails FS. The cover D is preferably configured as a glass cover.

The cover D is able to be displaced from a closed position for closing the roof opening DOE into an open position in order to open the roof opening DOE of the vehicle roof FD. To this end, the arrangements AO comprise deployment means. For opening, the cover D is raised in the region of a rear edge HK and is pushed over a rear part of the vehicle roof FD. To this end, it is necessary for the cover D to be raised since in the closed position it terminates flush with the upper face of the vehicle roof FD. In a first movement segment of a typical movement sequence, initially the rear edge HK of the cover D is deployed. This intermediate position is also denoted as the ventilation position. During the course of the opening movement, the cover D is displaced to the rear in the vehicle longitudinal direction into the open position. In this case, the cover D is additionally raised in the region of a front edge VK opposing the rear edge HK.

This typical movement sequence is implemented by means of the arrangements AO which are described in detail by means of the following FIGS. 2 to 8. In this case, in FIGS. 2 to 8, only one respective arrangement AO is shown on one side with the associated mechanism. All parts, however, are arranged mirror-symmetrically relative to a central longitudinal plane of the vehicle on both sides of the roof opening DOE. The arrangement AO may also be denoted as the deployment device.

It is worth noting that a cover support DT which is coupled in a mechanically fixed manner to the cover D is shown in FIGS. 4 and 5. Thus the cover D is directly coupled to the deployment means of the arrangements AO and is able to be moved thereby. A displacement of the cover D has the same meaning as a displacement of the cover support DT.

Moreover, in FIGS. 2 to 8 in each case a coordinate system is shown which shows the X-direction and Z-direction and/or X, Y, Z. The coordinate system corresponds to the mathematical right-handed system. The X-direction in this case may also be denoted as the vehicle longitudinal direction or the horizontal direction and the Z-direction may also be denoted as the vertical direction.

FIGS. 2 and 3 show a kinematic principle of the arrangement AO in two states. FIG. 2 shows in this case the arrangement AO in the closed position of the cover, whilst FIG. 3 shows the arrangement AO in the ventilation position. By means of FIGS. 2 and 3, the basic mechanics and kinematics are described schematically. Further details are explained with reference to the further FIGS. 4 to 8.

The deployment means of the arrangement AO comprise a front deployment lever VH, a control rod SS, a slotted link carriage SK, a sliding carriage S and a rear deployment lever HH. Moreover, the arrangement AO comprises two slotted links which are stationarily fixed relative to the guide rail FS, namely a first stationarily fixed slotted link KO1 and a second stationarily fixed slotted link KO2. The sliding carriage S has a slotted link carriage K. The control rod SS has a slotted control link KS.

The sliding carriage S is displaceable to the rear by means of a drive A in the vehicle longitudinal direction, wherein said sliding carriage is guided in the guide rail FS. The sliding carriage S may also be denoted as the drive slide. For example, the sliding carriage S is coupled to an electric motor via a drive cable.

The rear deployment lever HH is guided by means of two coupling elements KES1 in the slotted link carriage K. In this case, the two coupling elements KES1 of the rear deployment lever HH are located in different planes of the slotted link carriage K relative to the cover D. The rear deployment lever HH is pivotably coupled to the cover D by a further coupling element KES2.

The front deployment lever VH is coupled by a coupling element KE to the stationarily fixed slotted link KO1. Moreover, the front deployment lever VH in a front end region VE is pivotably coupled to the cover D in the region of the front edge VK. Additionally, the front deployment lever VH in a rear end region HE is coupled to the slotted link carriage SK in a manner which is pivotable and vertically displaceable in the Z-direction.

The control rod SS is pivotably coupled to the sliding carriage S and displaceably guided on the slotted link carriage KS relative to the guide rail FS. In other words, a movement of the control rod SS is substantially locked in the Z-direction. The front deployment lever VH is coupled in the rear end region HE to the slotted control link KS of the control rod SS.

In the first movement segment the sliding carriage S is displaced to the rear by means of the drive A, starting from the closed position shown in FIG. 2 of the cover D in the vehicle longitudinal direction. In this case, the sliding carriage S is initially moved relative to the cover D, wherein the rear edge HK of the cover D in the Z-direction is deployed upwardly away from the guide rail FS. This state is shown in FIG. 3 and is denoted as the ventilation position of the cover D. When displacing the sliding carriage S, the control rod SS is also moved relative to the guide rail FS due to its coupling with the sliding carriage S. Since the cover D is not initially displaced in the X-direction, the front deployment lever VH remains substantially in its position relative to the vehicle longitudinal direction.

In the first movement segment, by its displacement relative to the guide rail FS the slotted control link KS of the control rod SS controls a vertical movement of the rear end region HE. As a result, the rear end region HE moves in the Z-direction toward the guide rail FS (shown in dashed lines). Since the front deployment lever VH is guided with the coupling element KE, which is for example a sliding element or a rotating slide, in the stationarily fixed slotted link KO1, by the vertical movement of the rear end region HE of the front deployment lever VH, said lever is rotated about the coupling element KE. In this case, the front end region VE moves in the Z-direction upwardly away from the guide rail FS. This is because the coupling element KE of the front deployment lever VH is arranged between the rear end region HE and the front end region VE. In other words, the two end regions HE and VE are located on different sides relative to a plane which extends perpendicular to the X-direction through the coupling element KE.

By means of the rotation it is achieved that the front edge VK of the cover D does not substantially perform any movement in the Z-direction (see FIG. 3). Thus the front edge VK remains substantially flush with the vehicle roof FD and/or with the roof frame portion DRA defining the roof opening DOE. Thus the drawbacks mentioned in the introduction, such as for example the negative noise development, may be avoided. Moreover, as a result, the wind resistance of the vehicle at high speeds is reduced, for example.

If such a rotational movement of the front deployment lever VH were not provided, when deploying the rear edge of the cover, the front edge VK of the cover would be moved downwardly in the Z-direction in the direction of the guide rail FS. This state is shown in FIG. 3 by means of a dashed-dotted view of a cover D' with a front edge VK'.

At this point it should be mentioned that the deployment of the rear edge HK of the cover D is not described in more detail. Instead, the description is focused on the compensation of the vertical movement of the front edge VK of the cover D.

FIGS. 4 and 5 show a possible structural design of the arrangement AO. In this case, FIG. 4 shows the arrangement AO in an exploded view, whilst FIG. 5 shows the arrangement AO in an assembled and mounted state. In particular, a part of the sliding carriage S may be seen, the slotted link carriage K being formed therein. Moreover, the control rod SS with the slotted control link KS is shown. Furthermore, a slotted link component KB is shown, the stationarily fixed slotted link KO1 (not visible) being formed therein. Moreover, the coupling element KE of the front deployment lever VH is shown, said front deployment lever being guided thereby in the stationarily fixed slotted link KO1 at least in the closed position of the cover D.

As already described, the front deployment lever VH is coupled to the slotted link carriage SK in a pivotable and vertically displaceable manner. In this case, the front deployment lever VH is not directly coupled to the slotted link carriage SK but indirectly via a sliding element SE. This sliding element is pivotably fixed relative to a pivot axis SA at the rear end region HE of the front deployment lever VH. As may be seen in FIG. 5, the front deployment lever VH is coupled by the sliding element SE to the slotted link carriage SK. In this case, the sliding element SE is mounted in the slotted link carriage SK so as to be displaceable in the vertical direction. This means that the rear end region HE of the front deployment lever VH is able to be moved via the sliding element SE away from the guide rail FS or toward the guide rail. Thus the front deployment lever VH is coupled to the slotted link carriage KS in a manner which is both pivotable and vertically displaceable.

As already mentioned, the control rod SS is pivotably coupled to the sliding carriage S. Alternatively, a rigid coupling may also be provided. Moreover, the slotted link carriage SK comprises one or more through-holes DB, the control rod SS being guided therethrough. Thus, the control rod SS is displaceable relative to the slotted link carriage SK and thus the front deployment lever VH.

It is possible that the control rod SS may perform a slight rotational movement relative to one or more through-holes DB, in particular during the aforementioned movement sequence. This may be necessary in order to compensate for a slightly curved shape of the guide rail FS (not shown).

Alternatively, the control rod SS could also be guided in a further stationarily fixed slotted link relative to the guide rail FS.

The sliding element SE comprises a coupling element KES on a side facing the control rod SS (see FIGS. 6 to 8). In the mounted state, the sliding element SE is in engagement with the slotted control link KS of the control rod SS via the coupling element KES. Thus the front deployment lever VH is coupled via the sliding element SE to the control rod SS.

In an alternative embodiment, not shown, the sliding element SE is dispensed with. In this case, the front deployment lever VH in its rear end region HE is directly coupled to the slotted link carriage KS in a pivotable manner. For example, to this end the slotted link carriage KS comprises a slot, a coupling element of the front deployment lever VH being guided therein in a rotatable and vertically displaceable manner. Additionally, in the rear end region HE the front deployment lever VH comprises a further coupling element, said front deployment lever being in engagement thereby with the slotted control link KS of the control rod SS. In this case, it has to be ensured that the front deployment lever VH is rotatably guided with the further coupling element in the slotted control link KS. In such an embodiment, the sliding element SE could be dispensed with, which makes savings with regard to material costs and assembly.

The path of the slotted control link KS is designed such that a distance is increased between the guide rail FS and the slotted control link KS in the vehicle longitudinal direction to the rear. In a rear portion HA the distance is larger than in a front portion VA. As already mentioned, the rotational movement of the front deployment lever around the coupling element KE is controlled by means of the slotted control link KS. The slotted control link K and/or the path thereof is configured according to this rotational movement.

Depending on how rapidly the rotational movement is to be performed when moving the sliding carriage S, the distance between the slotted control link KS and the guide rail FS may be altered to a greater or lesser degree. With regard to a time curve of the rotational movement, when displacing the sliding carriage S, the distance of the slotted control link KS and the guide rail FS may be altered with a greater or lesser gradient. Alternatively or additionally, the curve may be altered in a curved, step-like linear manner or the like.

The movement sequence described by means of FIGS. 2 and 3 is described again briefly in the following FIGS. 6 to 8. For reasons of clarity, in this case the view of the cover support DT for coupling the front deployment lever VH to the cover D has been dispensed with.

FIG. 6 shows in this case the arrangement in the closed position of the cover. The front deployment lever VH in this case is coupled in the rear portion HA of the slotted control link KS to the control rod SS. In other words, the coupling element KES of the sliding element SE is located in the rear portion HA of the slotted control link KS. In the closed position of the cover D, the front edge VK of the cover terminates substantially flush with the vehicle roof FD.

Additionally, a seal DI which is arranged between the front edge of the cover VK and the vehicle roof FD is also shown in FIG. 6.

If the sliding carriage S is now displaced in the vehicle longitudinal direction to the rear, starting from the position shown in FIG. 6, the cover D is deployed on its rear edge HK in the Z-direction. In this case, the control rod SS moves relative to the slotted link carriage SK. In this first movement segment, the cover D is not yet displaced to the rear in the vehicle in the vehicle longitudinal direction. As the slotted link carriage SK is guided in the guide rail FS and the control rod SS does not substantially perform any movement in the Z-direction, due to the coupling with the slotted link carriage KS, the slotted control link KS controls a movement of the coupling element KES of the sliding element SE in the Z-direction downwardly in the direction of the guide rail FS. In this case the coupling element KES of the sliding element SE is guided in the direction of the front portion VA of the slotted control link KS.

By the movement of the coupling element KES of the sliding element SE in the Z-direction, the rear end region HE of the front deployment lever is moved downwardly in the Z-direction in the direction of the guide rail FS, wherein the front deployment lever VH is pivoted around the coupling element KE. Due to the rotation, the front edge VK of the cover D remains substantially in its position relative to the Z-direction. In this case, the distance AB of the front end region VE relative to the guide rail FS is increased. This increase of the distance AB corresponds to the compensation of the movement of the front edge VK of the cover D, so that said front edge remains substantially in position. This state is shown in FIG. 7. In comparison with the state shown in FIG. 6, a distance between the sliding carriage S and the slotted link carriage SK and/or the front deployment lever VH is increased in the first movement segment.

If the sliding carriage S is displaced further to the rear, after the rear edge HK of the cover D has been fully deployed, this cover is pushed across the vehicle roof FD. This state is shown in FIG. 8, wherein the front edge VK is slightly removed from the sealing element DI and the vehicle roof FD. Moreover, by means of the coupling element KE the front deployment lever VH has been displaced in the stationarily fixed slotted link KO1 in the X-direction. Moreover, the front edge VK of the cover D is not substantially altered in the Z-direction.

All parts and elements shown could be altered and/or varied in their specific shape, wherein the basic operating principle of the kinematic and mechanical arrangement explained here is intended to remain the same.

The invention claimed is:

1. An arrangement comprising a cover for a vehicle roof, the cover comprising a front edge and a rear edge opposing the front edge and, starting from a closed position for closing a roof opening, the cover raiseable in the rear region thereof by deployment means in order to open the roof opening, the deployment means having
   a sliding carriage, which is displaceable in a guide rail along a vehicle longitudinal direction;
   a deployment lever (VH) having a front end region, a rear end region and a coupling element arranged between the front end region and the rear end region, wherein in the closed position of the cover the deployment lever is in engagement with a slotted link which is stationarily fixed relative to the guide rail by means of the coupling element;
   a slotted link carriage, which is arranged so as to be displaceable in the guide rail along the vehicle longitudinal direction, the deployment lever being coupled thereby in a manner which is pivotable and displaceable in a direction between the cover and the guide rail; and
   a control rod, which is coupled to the sliding carriage and which is guided so as to be displaceable relative to the guide rail along the vehicle longitudinal direction; wherein the control rod comprises a slotted control link, the deployment lever being coupled thereto such that in a first movement segment, starting from the closed position of the cover, with a displacement of the sliding carriage in the vehicle longitudinal direction to the rear, the slotted control link controls a rotation of the deployment lever around the coupling element.

2. The arrangement according to claim 1, wherein in the first movement segment the slotted control link controls a vertical movement of the rear end region of the deployment lever, such that a distance between the rear end region and the guide rail is reduced.

3. The arrangement according to claim 1, wherein in the first movement segment the slotted control link controls a vertical movement of the rear end region of the deployment lever, such that a distance between the front end region and the guide rail is increased.

4. The arrangement according to claim 1, wherein in the first movement segment the slotted control link controls a vertical movement of the rear end region of the deployment lever, such that a distance between the front edge of the cover and the guide rail remains substantially the same.

5. The arrangement according to claim 1, wherein the control rod is displaceably guided relative to the guide rail on the slotted link carriage.

6. The arrangement according to claim 1, further comprising a sliding element which is pivotably arranged on the deployment lever in its rear end region, wherein the sliding element is coupled in a vertically displaceable manner to the slotted link carriage and wherein the sliding element comprises a coupling element, the sliding element being guided thereby in the slotted control link.

7. The arrangement according to claim 1, wherein a distance between the slotted control link and the guide rail is altered in the vehicle longitudinal direction.

8. The arrangement according to claim 7, wherein the path of the slotted control link is altered, such that a distance between the slotted control link and the guide rail relative to the vehicle longitudinal direction is increased to the rear.

9. The arrangement according to claim 1, wherein the sliding carriage is displaceably coupled to the slotted link carriage via the control rod, such that in the first movement segment a distance between the sliding carriage and the deployment lever is increased.

10. The arrangement according to claim 1, additionally comprising a further deployment lever which is pivotably coupled in the region of the rear edge to the cover and to the sliding carriage, such that in the first movement segment a deployment of the cover is controlled when displacing the sliding carriage, wherein a distance between the rear edge of the cover and the guide rail is increased.

* * * * *